(No Model.)

E. L. T. ROBERTSON.
FRYING PAN.

No. 471,227. Patented Mar. 22, 1892.

Witnesses.
Maggie E. Angell.
George E. Lucas.

Inventor:
Emma L. T. Robertson
by Chas. H. Riches
her attorney.

UNITED STATES PATENT OFFICE.

EMMA L. T. ROBERTSON, OF PORT HOPE, CANADA.

FRYING-PAN.

SPECIFICATION forming part of Letters Patent No. 471,227, dated March 22, 1892.

Application filed April 6, 1891. Serial No. 387,832. (No model.)

*To all whom it may concern:*

Be it known that I, EMMA L. T. ROBERTSON, of the town of Port Hope, in the county of Durham, in the Province of Ontario, Canada, have invented certain new and useful improvements in Frying-Pans; and I hereby declare that the following is a full, clear, and exact description of the same.

My invention has relation to improvements in frying-pans of that class wherein an air-draft is produced for conducting into the fire the odors or emanations arising from cooking, the object being to provide a simple and convenient device for the purpose.

With the above object and others in view the invention consists in the improved construction and combination of parts, as hereafter more fully set forth.

Figure 1:
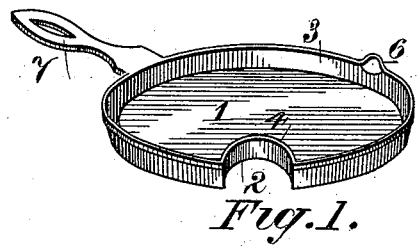
Figure 2:
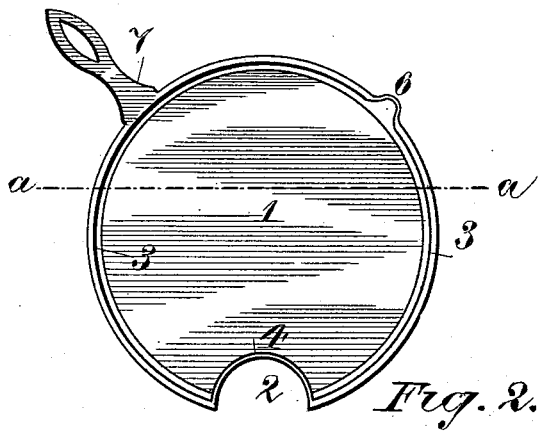
Figure 3:
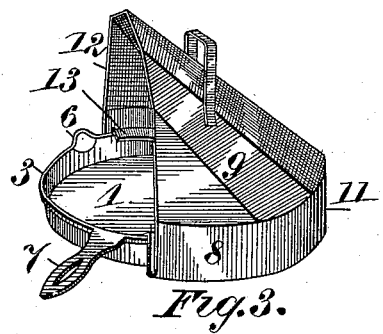
Figures 4, 5:
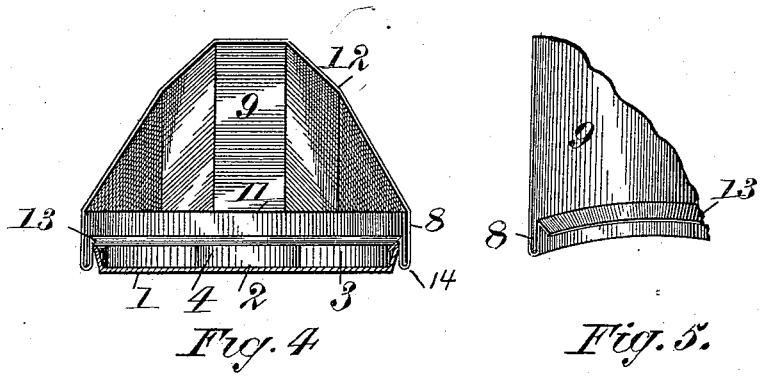

Figure 1 is a perspective view showing my improvements in the form of a frying-pan. Fig. 2 is a plan view of the same. Fig. 3 is a perspective view of the cover and the frying-pan. Fig. 4 is a sectional view showing the manner in which the cover is applied to the pan. Fig. 5 is a perspective view of a section of the cover, showing the supporting-flange.

Like numerals of reference refer to like parts throughout the specification and drawings.

In the drawings, 1 represents the bottom of the frying-pan, the circle of which is broken by a semicircular recess 2 of at least two and one-half inches in radius. The wall 3, encircling the bottom 1, slants upwardly and outwardly, while the wall 4, encircling the recess 2, is perpendicular to the said bottom. The lip 6 of the pan is at right angles to the handle 7, and the recess 2 is equidistant between the said lip and handle.

The cover consists of a band 8, which incloses about two-thirds of the circular wall of the frying-pan and is slightly greater in depth than the same. Secured to the upper edge of the band 8 is a top 9 in the form of a cone, which tapers upwardly from the back 11 of the said band 8 to the front 12, the front of the top and band being open. On the inner face of the band 8 is a flange 13, extending inwardly at an acute angle to the said band and formed integral therewith for the purpose of firmly supporting the same on the frying-pan. The line $a\,b$, Fig. 2, and the wall 3 show the portion of the pan inclosed by the cover. It will be noticed by reference to the drawings that the said band incloses the recess 2 and forms the outer wall of the duct or ventage leading into the stove for the purpose of drawing the vapors or emanations of the cooking, &c., from the frying-pan into the fire. The object of having a cover of this form and provided with an open side is to enable the cook to attend to the contents without removing the cover from the pan and allowing the vapors from the contents to mingle with and taint the atmosphere of the room. The cover encircles sufficient of the pan to prevent the spatters getting onto the stove, burning, or making a smoke, and the draft caused by the current of air entering through the open side forces all vapors, odors, spatters, &c., arising from the contents through the duct into the stove.

It will be noted that the cover at its lower edge is bent into loop form, as indicated at 14, and from the upper edge of the inner side of the loop projects inward the oblique flange 13. The object of an oblique flange is to have it fit as accurately as possible the outwardly-inclined wall 3.

A pan of this construction requires no more work to cast it than an ordinary frying-pan.

Having thus fully described my invention, what I claim as new, and desire to secure by Letters Patent, is—

1. The combination, with a frying-pan having an air-duct formed therein, of a cover adapted to partially inclose the surrounding wall of the pan, said cover provided with an inwardly-extending flange resting upon the top edge of the surrounding wall, substantially as set forth.

2. The combination, with a frying-pan having an air-duct formed therein and its surrounding wall inclined outwardly, of a cover provided with an inwardly-extending flange at an angle thereto, adapted to be seated upon the surrounding wall of the pan, substantially as set forth.

3. The combination, with a frying-pan having its surrounding wall inclined outwardly and provided with a semicircular recess bordered by perpendicular edges, of a partly-circular cover adapted to surround the greatest portion of the pan, having a cone-shaped upper portion and its lower portion terminating in a perpendicular band, said band being bent into the form of a loop, with the upper edge of the inner side of the loop provided with a flange extending at an angle therefrom, substantially as set forth.

Port Hope, March 24, 1891.

EMMA L. T. ROBERTSON.

In presence of—
 GEORGE M. FURBY,
 C. A. MANNETS.